United States Patent [19]
Lagoni et al.

[11] Patent Number: 4,660,088
[45] Date of Patent: Apr. 21, 1987

[54] QUASI-PARALLEL TELEVISION IF SUITABLE FOR STEREO SOUND RECEPTION

[75] Inventors: William A. Lagoni; Gregory G. Tamer; Max W. Muterspaugh; Abraham E. Rindal, all of Indianapolis, Ind.

[73] Assignee: RCA Corporation, Princeton, N.J.

[21] Appl. No.: 556,127

[22] Filed: Nov. 29, 1983

[51] Int. Cl.$^4$ .................. H04N 5/62; H04N 5/60
[52] U.S. Cl. .................. 358/198; 358/197
[58] Field of Search .................. 358/197, 198, 191.1, 358/142, 196, 160; 329/134

[56] References Cited

U.S. PATENT DOCUMENTS

| | | | |
|---|---|---|---|
| 3,796,963 | 3/1974 | Balaban | 329/101 |
| 4,199,786 | 4/1980 | Orii | 358/197 |
| 4,283,792 | 8/1981 | Hongs et al. | 358/195.1 |

OTHER PUBLICATIONS

Telefunken Service Manual for VR520/VRU620/920/1920 VR520SA/VR520 Ut Video Recorders, p. 48.
Schematic for SEL Digital Chassis IFB281, published Aug. 1983.
"Intercarrier Buzz Phenomena Analysis and Cures" by P. Fockens and C. G. Eilers appearing in IEEE Transactions on Consumer Electronics, vol. CE-27, No. 3, Aug. 1981.
Philips Application Note ET 17506, p. A2.
RCA Television Service Data, File 1972 CT5, pp. 21-24.

Primary Examiner—Tommy P. Chin
Attorney, Agent, or Firm—P. J. Rasmussen; P. M. Emanuel; R. H. Kurdyla

[57] ABSTRACT

A multiplier for multiplying the modulated sound and picture carriers to produce an intercarrier sound signal in a quasi-parallel sound channel of an IF section has a pair of anti-parallel connected diodes in a limiter for generating an amplitude limited version of the picture carrier. It has been discovered that the varying capacitance of the diodes with picture amplitude can cause phase shifts and hence phase modulation interference in the intercarrier signal. The latter is especially troublesome for stereo sound reproduction. To reduce such interference, a low value resistor is shunt coupled to the diodes to inhibit the capacitance variations of the diodes and resulting undesired phase modulation in the intercarrier sound signal.

17 Claims, 2 Drawing Figures

QUASI-PARALLEL TELEVISION IF SUITABLE FOR STEREO SOUND RECEPTION

BACKGROUND OF THE INVENTION

The present invention relates to a television IF (intermediate frequency) stage, and more particulary, to such a stage that has a sound detector suitable for use with stereo sound.

TV audio may be detected by first forming an intercarrier signal (at 4.5 MHz in the NTSC system) by mixing in a synchronous detector the picture carrier and the sound carrier. Specifically, in this method the picture and sound carriers are amplified, after the tuner, in a common IF gain block. An IF filter attenuates the sound carrier more than the picture carrier. The picture carrier is then limited and bandpass filtered in an additional separate path to form a reference picture carrier. This reference picture carrier is mixed by the synchronous detector with the IF signal to form both the intercarrier sound signal and the baseband video signal. It is desirable to reduce the amount of video amplitude modulation (AM) of the reference carrier signal in order to minimize spurious second order effects in the video signal since it is only the input modulation which is the desired mixer output signal and hence the need for limiting and filtering the reference signal. In this type of single channel intercarrier sound system, any frequency modulation (FM) or phase modulation (PM) which is imparted onto the picture carrier during the transmission or reception process is not removed from the picture carrier since an equal amount of angle modulation is also imparted during the transmission or reception process onto the sound carrier. When the two carriers are mixed to form the intercarrier sound signal, this common mode interference is cancelled. However, phase shifts in the non-common mode path, i.e., the filtering and limiting path for the reference video carrier, are not cancelled. Thus, a buzz in the audio signal can result, especially when stereo sound is to be produced, which requires a high bandwidth audio channel in order to transmit the stereo difference and subcarrier signals.

Another type of IF sound detection system is called "quasi-parallel" IF, in which sound and video signals are separately demodulated in different channels. The sound carrier is not attenuated in the sound channel (as in the single channel system), resulting in higher sound sensitivity. In the sound channel, the picture carrier is mixed with the sound IF signal to form the 4.5 MHz intercarrier sound signal, the baseband video being superfluous in this channel. In an effort to minimize the amount of baseband video produced by the mixing process, it has been thought that the phase of the limited and filtered picture carrier signal should be shifted by 90° so that this reference signal is in quadrature with the incoming picture carrier. In theory, this reduces the amount of AM that the limiter, in the subsequent FM detector, has to eliminate and therefore should eliminate buzz due to imperfect AM rejection in the FM detector.

However, the present applicants have discovered that most of the audio buzz which intefere with multichannel audio is produced due to the filtering and limiting of the picture carrier so that the quadrature mixer has little effect on the higher frequency audio buzz. Therefore, the applicants have discovered that in order to minimize this audio buzz, great care must be taken in the IF circuitry, particularly in the picture reference path to prevent phase shifts. If the phase shift of the amplifier and limiters in this reference path vary as a function of signal amplitude (as a result of varying transistor or diode junction capacitances), the amplitude of the video carrier will modulate the phase of this reference signal. Similarly, if the rise and fall times of the limiter are not symmetrical, the zero crossing of audio signal will be modulated by the amplitude of the picture carrier—again resulting in PM. If the positive and negative clipping levels are not identical, there will be additional PM due to AM. Additionally, if the amplitude or phase of the bandpass filter in this reference path is not perfectly symmetrical, there will also be AM converted to PM. In general, any change in phase as a function of time will be demodulated by the FM sound detector as an instantaneous frequency deviation and as such will produce an impulse output during every luminance transition. Since luminance transitions tend to repeat for at least a few lines, these transitions cause considerble buzz at the horizontal scanning frequency and multiples thereof. Although no standard has as yet been selected for stereo TV transmission in the United States, since all the proposed systems use the horizontal frequency and multiples of it for pilot and carrier frequencies, these spurious buzz signals can cause interference with the detection of the stereo pilot signal, the detection of the second audio program, produce a whistle or buzz beat in the stereo signals, or produce a buzz beat in the second audio program depending upon the proposed stereo system.

SUMMARY OF THE INVENTION

In accordance with the present invention, a quasi-parallel sound channel includes a multiplier having two inputs to which the IF signal of the quasi-parallel sound channel are applied by means which substantially prevent the introduction of phase shift due to impedance variations of devices within the multiplier in response to amplitude variations of the picture carrier.

In an embodiment of the invention in which an integrated circuit including a multiplier and a limiter having a pair of diodes for producing a limited picture carrier reference are arranged as a synchronous detector from the modulated picture carrier, a resistor external to the integrated circuit is coupled in shunt with the limiter output to swamp out diode capacitance variations. This tends to reduce the phase shift imparted by the limiter due to AM variations of the picture carrier and thereby reduce buzz in the demodulated audio signal.

DETAILED DESCRIPTION

Figure 1:
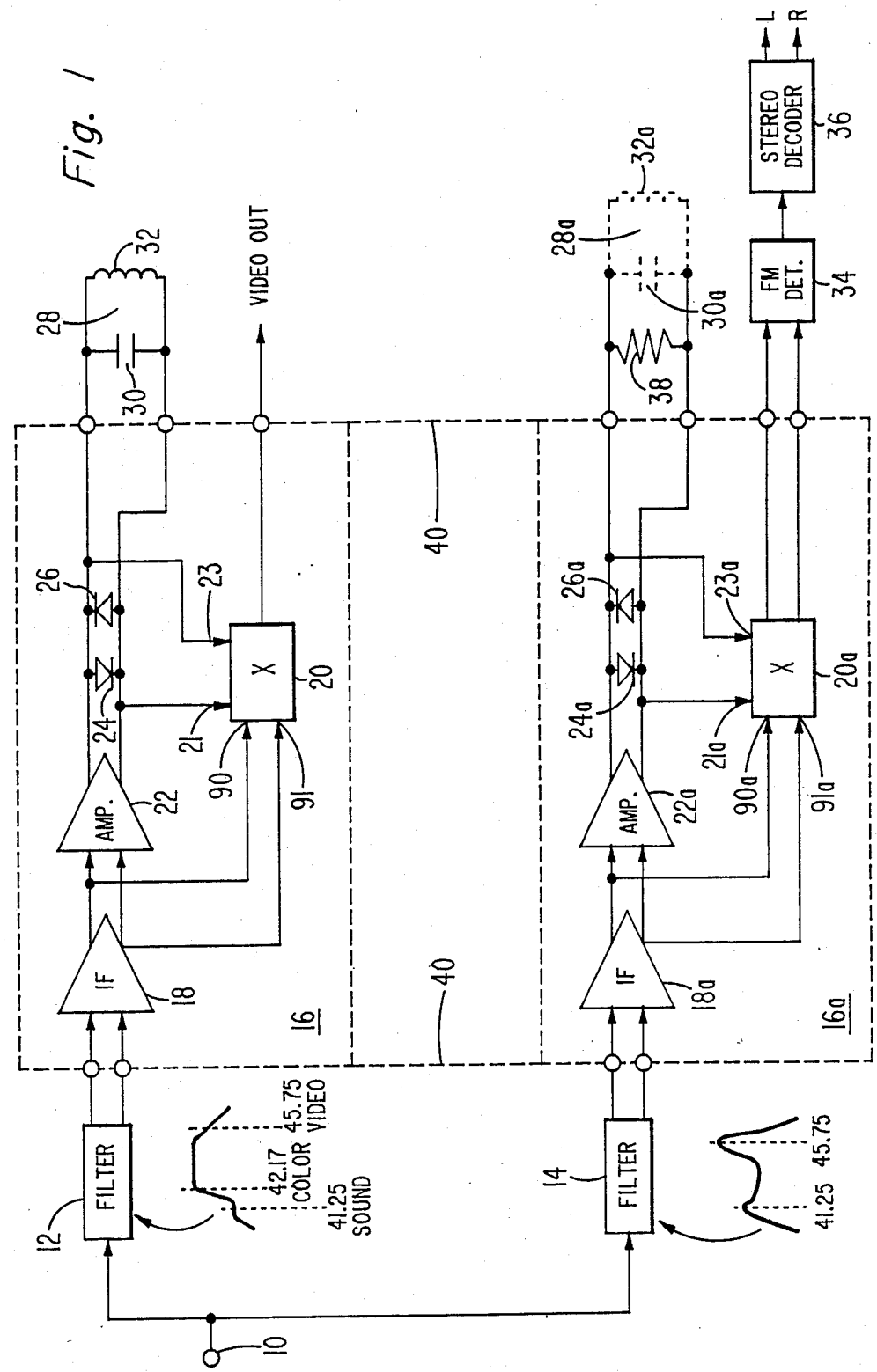
FIG. 1 is a partly block and partly schematic diagram of the preferred embodiment of the invention, wherein circled numbers refer to IC (integrated circuit) pin numbers.

In FIG. 1 input terminal 10 receives an IF signal from a tuner (not shown). The IF signal is of the conventional type for the NTSC system, i.e., it has a 45.75 MHz AM picture carrier and 41.25 MHz FM sound carrier. The IF signal is split into two separate channels for sound and picture information demodulation in accordance with the quasi-parallel principle by applying it to two filters 12 and 14.

Filter 12, which can be of the SAW (surface acoustic wave) type, has a response, as shown in the insert, matching the vestigal sideband video signal, and also attenuates the sound signal. The output signal from filter 12 is applied to IC (integrated circuit) 16 such as type TA7607 manufactured by Toshiba Corp. In the drawing only those portions of IC 16 are shown as are relevant to the invention.

Within IC 16, the IF signal is first applied to differential IF amplifier 18. The balanced output signals of amplifier 18 are then applied to inputs 90 and 91 of multiplier circuit 20, shown in detail in FIG. 2, and also to amplifier 22. The balanced output signals of amplifier 22 are applied across antiparallel connected diodes 24 and 26, inputs 21 and 23 of multiplier 20, and tank circuit 28 comprising capacitor 30 and inductor 32. Tank circuit 28 is tuned to the pictue carrier frequency of 45.75 MHz, and thus, for the most part, the only signal applied to inputs 21 and 23 of multiplier 20 has the picture carrier frequency since harmonics of the picture carrier frequency created by the limiting action of diodes 24 and 26 are attenuated by tank circuit 28. Amplifier 22 and diodes 24 and 26 together comprise a limiter so that an essentially constant amplitude picture carrier reference signal is applied to inputs 21 and 23.

Multiplier 20, limiting diodes 24 and 26 and tank circuit 28 comprise a synchronous detector that produces at its output a baseband composite video signal. The baseband video signal is applied to further video and color processing circuits (not shown) as known in the art.

Since a separate sound path is used, it is possible to demodulate a sound carrier that has not been suppressed by filter 12. This results in better sensitivity for the sound signal.

In the sound path, filter 14 comprises a double tuned circuit with a response having amplitude peaks at the sound and picture carrier frequencies. As shown by the insert, the picture carrier is desirably slightly, e.g. 3 db, stronger than the sound carrier to improve demodulation. The output signal from filter 14 is applied to IC 16a, elements of which that correspond to IC 16 have the same reference numerical with the suffix "a" added. While limiter diodes 24a and 26a (included in IC 16a) and tank circuit 28a are shown, the tank circuit being shown in phantom, as will be clear from the description below, according to the present invention the function of these elements have been substantially defeated by a resistor 38 connected in shunt with diodes 24a and 26a to avoid the generation of audio buzz. To understand this aspect of the present invention, assume that diodes 24a and 24b and tank circuit 28a function as in the video channel. In that case, the output signal from filter 14 is amplified by amplifier 18a, and limited by amplifier 22a and diodes 24a and 26a. Tank circuit 28a selects the picture carrier to be applied to a multiplier circuit 20a. Multiplier 20a provides a 4.5 MHz FM intercarrier signal to FM detector 34. Since the reference signal is not syncrhonous in frequency with the carrier intended to be demodulated, i.e., the 41.25 MHz sound carrier, this arrangement operates as a product detector rather than a synchronous detector. The outut signal of detector 34 is applied to stereo decoder 36, which in turn provides L (left) and R (right) baseband audio signals to audio amplifiers (not shown).

A problem with the sound demodulation circuit as thus far described is that the amplitude modulation of the picture carrier causes changes in the resistance and capacitance of diodes 24a and 26a, which in turn causes changes in the tuning and phase shift of tank circuit 28a. This in turn causes a PM component to exist at the horizontal frequency and harmonics thereof (as explained above), which components are undesirably demodulated by demodulator 34. For monophonic sound these components may not be annoying to a listener since the lowest undesired frequency component is at the horizontal frequency which is above the audio band. However, for stereophonic sound these components may be of sufficient strength to be annoying to a listener due to the wider bandwidth of the latter compared to the former and the necessarily wider bandwidth of detector 34.

According to an aspect of the present invention the above problem is overcome by placing a resistor 38 in shunt with diodes 24a and 26a. It has been found that for a value of about 15 to 150 ohms for resistor 38 the phase change due to varying diode impedance is significantly reduced. Also the voltage applied to the diodes 24a and 26a is reduced, thereby further reducing the diode impedance variations. As a result, circuit 16a can now be used to demodulate television FM stereo audio signals. It has been further found that value for resistor 38 of about 30 ohms was optimum. Under these conditions the selectivity (i.e., the Q) of tank circuit 28a is so low that it can be eliminated and is therefore shown in phantom.

Without tank circuit 28a both input signals to multiplier 20a have substantially the same broad bandwidth which helps to further reduce any incidental AM to PM conversion due to impedance variations of devices within mulitplier 20a interacting with filter components which would otherwise be there.

A 4.5 MHz intercarrier sound signal and a baseband video signal are produced at the output of multiplier 20a and coupled to detector 34. Since detector 34 is tuned to 4.5 MHz, it rejects the video signal.

Figure 2:
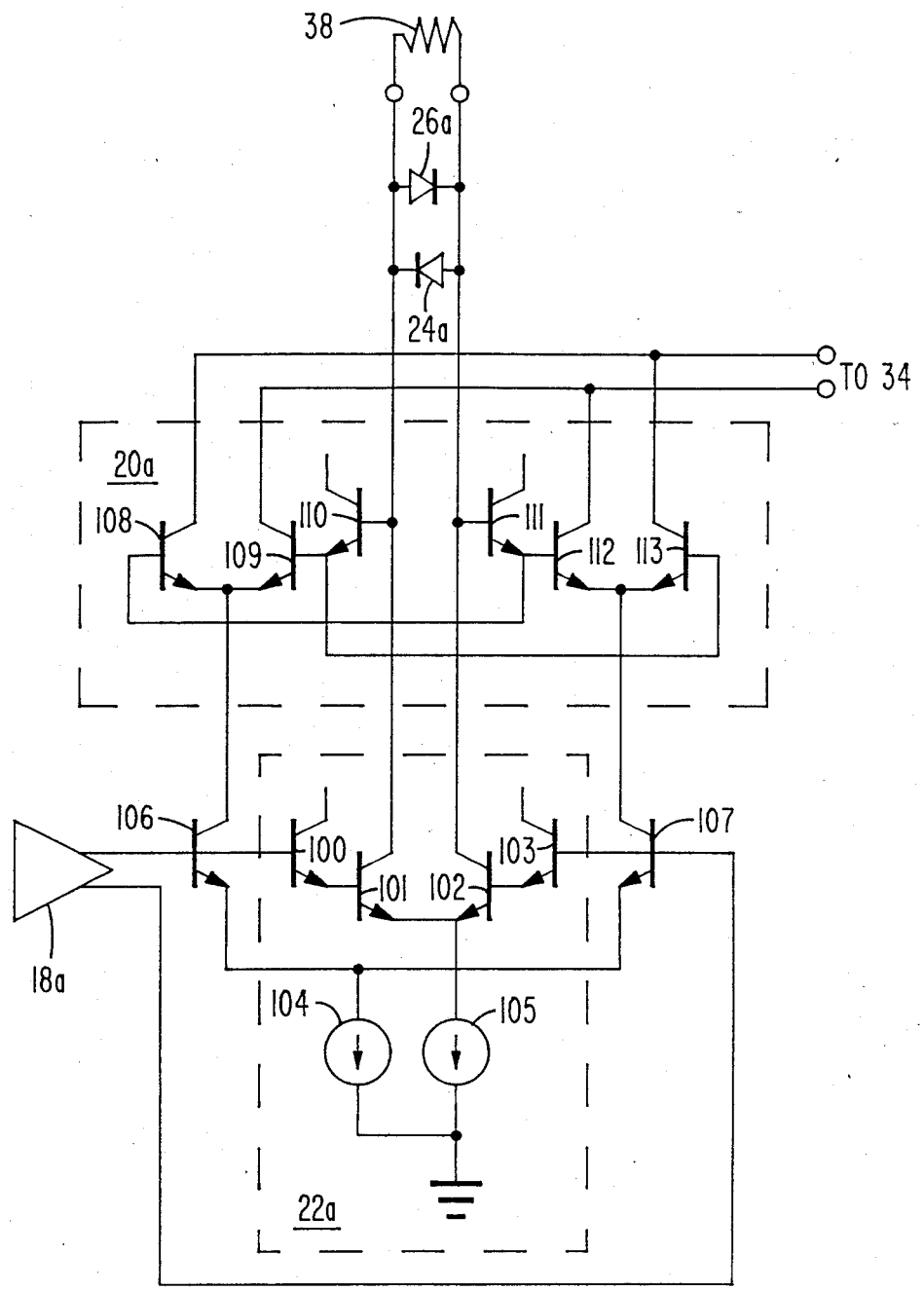
FIG. 2 is a schematic diagram of a multiplier circuit used in the embodiment of FIG. 1.

A simplified implementation of the multiplier and limiter structure of the TA 7607 IC of FIG. 1 is shown in FIG. 2. The multiplier shown in FIG. 2 is of the four quadrant type. Because of its balanced configuration, it requires a less critical biasing scheme than does a simple diode mixer. In a diode mixer conduction thresholds, and hence the bias circuits, are critical and vary with temperature. This makes it difficult to reliably establish the mixing range of a diode mixer for all amplitude variations of the picture carrier. Further, because the four quadrant multiplier is a balanced circuit as compared with a diode, the possibility of oscillations and DC offsets are significantly reduced. Since a diode multiplier requires single ended drive, oscillations due to ground paths in the IC and also DC unbalances tend to be a problem. Still further, since the multiplier operates to produce essentially only the products of the input signals, there are less distortion products than with a diode, which has an exponential transfer characteristic.

Briefly, in FIG. 2 amplifier 22a comprises transistors 100, 101, 102, and 103 and current sources 104 and 105. Transistors 100 and 103 are driven by amplifier 18a through emitter follower transistors 106 and 107 respectively. Multiplier 20a comprises transistors 108–113, Transistors 108 and 109 are a first differential pair and transistors 112 and 113 are a second differential pair. Transistors 110 and 111 are emitter followers. Amplifier 18a drives transistors 108 and 109 through transistor 106, and drives transistors 112 and 113 through transistor 107. Amplifier 22a drives transistors 110 and 111 from transistors 101 and 102 respectively with diodes 24a and 26a in the drive path.

If desired, ICs 16 and 16a can be combined in a single chip as by dotted lines 40 in FIG. 1. These and other modifications are contemplated to be within the scope of the present invention as defined by the following claims.

What is claimed is:

1. In the section of a television system for processing an IF signal containing a frequency modulated sound carrier and an amplitude modulated video carrier, apparatus comprising:

separate sound and video channels for demodulating said video and sound carriers;

means for coupling said IF signal including said amplitude modulated video carrier and said frequency modulated sound carrier to said sound channel;

limiter means coupled to receive said IF signal in said sound channel having a non-linear impedance element coupled to the output of said limiter means for generating a limited IF signal corresponding to an amplitude limited version of said IF signal, said limited IF signal being susceptible to undesirable phase shifts varying in accordance with said modulated video carrier due to the repsonse of said non-linear impedance element to the amplitude of said modulated video carrier;

multiplier means in said sound channel having a first input coupled to receive said IF signal, a second input, coupled to receive said limited IF signal, and an output, for providing at said output an intercarrier frequency modulated sound signal, said intercarrier frequency modulated sound signal being susceptible to containing undesired frequency modulation components due to said undesirable phase shifts; and resistance means shunt coupled to said limiter means of said sound channel for reducing the extent of impedance variation of said non-linear impedance element in response to the amplitude of said amplitude modulated video carrier and thereby suppressing said undesired frequency modulation components of said intercarrier sound signal.

2. Apparatus as claimed in claim 1 wherein said resistance means comprises a resistor shunt coupled to said limiter means.

3. Apparatus as claimed in claim 2, wherein said non-linear impedance element comprises a pair of anti-parallel connected diodes.

4. Apparatus as claimed in claim 2, wherein said resistor has a value of from 15 to 150 ohms.

5. Apparatus as claimed in claim 4, wherein said value is 30 ohms.

6. Apparatus as claimed in claim 1, further comprising a resonant tank circuit coupled to said output of said limiter means.

7. Apparatus as claimed in claim 6, wherein said tank circuit is resonant at the frequency of said video carrier frequency.

8. Apparatus comprising:

input means providing a television signal having an amplitude modulated video carrier and a frequency modulated sound carrier;

a first filter coupled to said input means for passing said amplitude modulated video carrier;

first limiter means coupled to said first filter, including diode element for generating an amplitude limited version of said video carrier;

a tank circuit coupled to said diodes and tuned to the frequency of said video carrier;

a first multiplier having a pair of inputs coupled to the outputs of said first filter and said limiter, respectively, and an output providing a demodulated video signal;

a second filter coupled to said input means for passing both of said amplitude modulated video carrier and said frequency modulated sound carrier;

second limiter means coupled to said second filter including a diode element for generating an amplitude limited version of at least said video carrier, said limited video carrier being susceptible to phase shifts varying in accordance with the amplitude of said modulated video carrier due to the response of said diodes to the amplitude of said modulated video carrier;

a second multiplier having a pair of inputs coupled to the outputs of said second filter and said second limiter, respectively, for providing an intercarrier frequency modulated sound signal, said intercarrier sound signal being susceptible to containing undesired frequency modulation components due to said phase shifts of said limited video carrier produced by said second limiter; and resistance means shunt coupled to said second limiter means for reducing the extent of impedance variations of said diodes in response to the amplitude of said modulated video signal and thereby suppressing said undesired components of said intercarrier sound signal.

9. Apparatus as claimed in claim 8, wherein at least said second limiter means and said second multiplier are included within an integrated circuit.

10. Apparatus as claimed in claim 9, wherein said resistance means comprises a resistor external to said integrated circuit and coupled to said diode of said second limiter means.

11. Apparatus as claimed in claim 8, wherein both of said limiters and both of said multipliers are fabricated on a single integrated circuit.

12. Apparatus as claimed in claim 8, wherein at least said second limiter means and said second multiplier are fabricated on a single integrated circuit.

13. Apparatus as claimed in claim 12, wherein said resistance means comprises a resistor external to said integrated circuit and coupled to said diode of said second limiter means.

14. In a quasi-parallel sound channel, apparatus comprising:

a multiplier having first and second balanced inputs and an output, said multiplier including therein a component exhibiting impedance variations responsive to amplitude variations of said amplitude modulated video carrier.

a source of intermediate frequency television signals having an amplitude modulated video carrier and a frequency modulated sound carrier;

first and second coupling means with substantially the same bandwidth for coupling said intermediate frequency signal to said first and second balanced inputs of said multiplier;

said multiplier producing an intercarrier sound signal at said output, said intercarrier sound signal being subject to phase shifts due to said impedance variations of said component of said multiplier in response to amplitude variations of said amplitude modulated video carrier; and preventing means coupled to said second input of said multiplier for substantially preventing said phase shifts.

15. Apparatus as claimed in claim 14, wherein
said multiplier includes amplitude limiting means coupled to said second balanced input, and
said preventing means comprises a resistor shunt coupled to said amplitude limiting means.

16. Apparatus as claimed in claim 14, wherein said multiplier comprises a four quadrant multiplier.

17. Apparatus as claimed in claim 16, wherein said four-quadrant multiplier comprises first and second differential pairs of transistors, the emitters of each of said pairs comprising said first balanced multiplier input, the base electrodes of each of said pairs comprising said second balanced multiplier input.

* * * * *